No. 612,016. Patented Oct. 11, 1898.
P. L. CLARK.
PNEUMATIC TIRE.
(Application filed Apr. 9, 1897.)
(No Model.) 2 Sheets—Sheet 1.

Witnesses
A. F. Durand.
Margant M. Wagner.

Inventor:
Percy L. Clark
by Page & Belfield,
attys

No. 612,016. Patented Oct. 11, 1898.
P. L. CLARK.
PNEUMATIC TIRE.
(Application filed Apr. 9, 1897.)
(No Model.) 2 Sheets—Sheet 2.
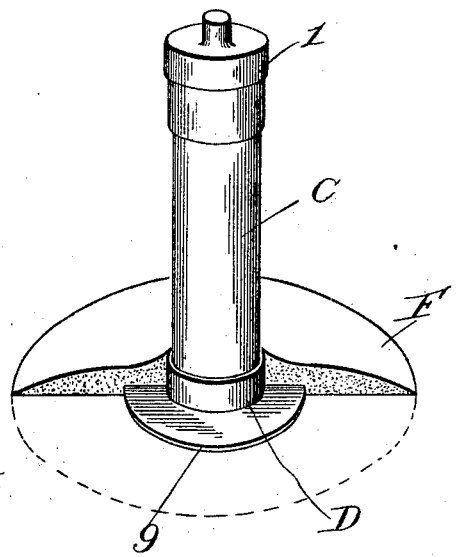
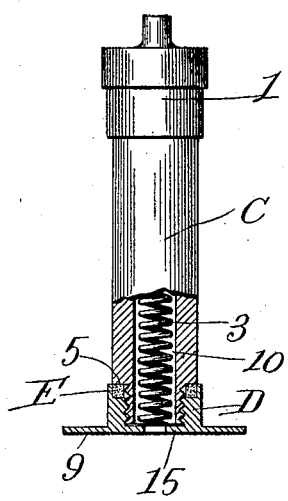
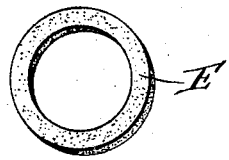
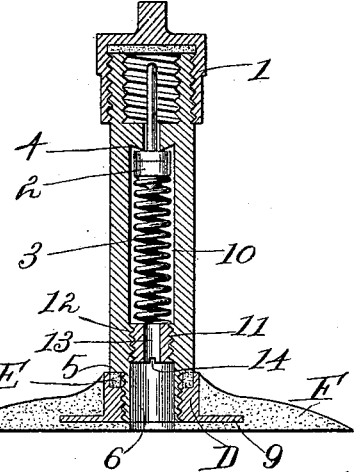
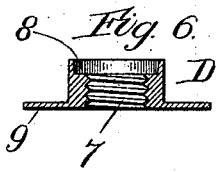
Witnesses:
A. F. Durand.
Margaret M. Wagner.
Inventor:
Percy L. Clark,
by Page & Belfield,
Attys.
THE NORRIS PETERS CO., PHOTO-LITHO., WASHINGTON, D. C.

UNITED STATES PATENT OFFICE.

PERCY L. CLARK, OF CHICAGO, ILLINOIS, ASSIGNOR TO THE MORGAN & WRIGHT, OF SAME PLACE.

PNEUMATIC TIRE.

SPECIFICATION forming part of Letters Patent No. 612,016, dated October 11, 1898.

Application filed April 9, 1897. Serial No. 631,369. (No model.)

*To all whom it may concern:*

Be it known that I, PERCY L. CLARK, a citizen of the United States, residing at Chicago, in the county of Cook and State of Illinois, have invented a certain new and useful Improvement in Pneumatic Tires, of which the following is a specification.

The object of my invention is to provide a simple and efficient construction of air-tight connection between the valve-casing and the sheath or inner tube of a pneumatic tire and to permit the valve-casing to be detached when necessary, to reduce the labor and expense involved in providing a connection between the valve-casing and the sheath or inner tube, and to permit the valve-casing to be detached and the valve removed therefrom.

To the attainment of the foregoing and other useful ends my invention consists in matters hereinafter set forth.

Figure 1:
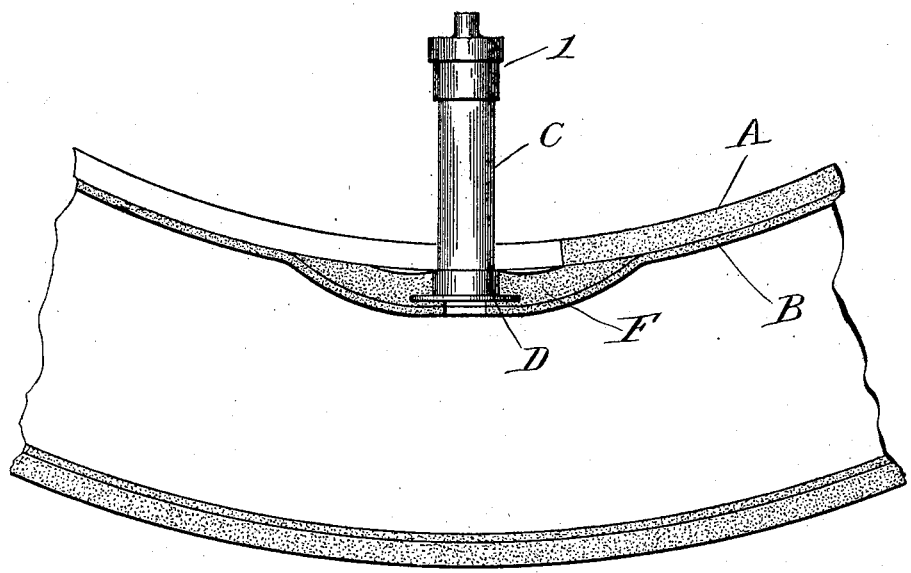
Figure 2:
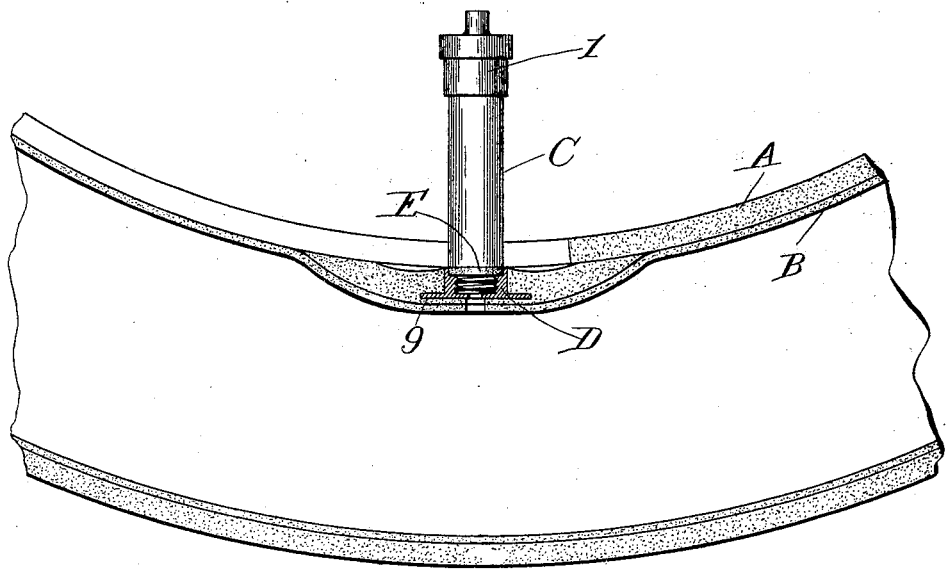

In the accompanying drawings, Figure 1 represents a section taken through a portion of a pneumatic-tire sheath and inner tube with the valve-casing connected with the inner tube and shown in elevation. Fig. 2 is a like view with the socket shown in Fig. 4 in central longitudinal section. Fig. 3 represents the valve-casing in perspective, with a rubber base in which a flanged socket is embedded, shown partly in perspective and partly in elevation. Fig. 4 shows the valve-casing partly in elevation and partly in section, the socket being formed with a seat for the spring and shown in section. Fig. 5 shows the valve-casing, socket, and rubber base in central section. Fig. 6 shows the socket in central section. Fig. 7 is a perspective of the annular packing-ring.

The pneumatic tire, of which a portion only is shown, comprises a sheath A and an inner tube B.

The valve-casing C is provided at one end with a cap 1 and contains a valve 2 and a spring 3, arranged to normally hold the valve against a seat 4. The opposite end of the valve-casing is externally reduced in diameter, so as to provide it with an offset or shoulder 5. This reduced end 6 of the valve-casing is externally threaded, whereby it can be screwed into the internally-threaded socket D. The socket D has a short threaded bore or opening 7, which said bore has a short laterally-expanded and unthreaded portion adapted to form an annular seat 8 for an annular packing-ring E.

The socket D is provided with a base-flange 9 and is embedded in a flattened rubber base F, which is molded with the socket embedded in it, by which arrangement the rubber base can be molded much more expeditiously and economically than where the lower portion of a single or two-part valve-casing is embedded in such bore and arranged to extend above the same. In accordance with my improvement, however, the socket can be entirely embedded in the rubber base, so that its upper end will be flush or substantially flush with the upper side of the rubber base. The packing-ring E is fitted to the seat 8, and the reduced threaded end 6 of the valve-casing is screwed down into the threaded portion of the socket, so as to cause the shoulder 5 of the valve-casing to clamp upon the packing-ring, in which way an air-tight joint is provided between the valve-casing and the socket, and by embedding the socket in the rubber base an air-tight connection is provided between said two members. Where the tire is constructed with an inner tube, the rubber base is cemented to the latter, it being understood that in a single-tube tire the rubber base can be attached to the latter, as usual.

In order to provide a seat for the lower end of the spring, I internally thread a portion of the bore or cylindric chamber 10 of the valve-casing, as at 11, and screw within such threaded portion of the valve-chamber a screw-plug 12, having a central opening 13 for the passage of air. I prefer to arrange the screw-thread 11 somewhat above the lower end of the valve-casing, and in order to permit the plug 12 to be introduced and removed I provide it with a notch 14, in which a tool, such as a screw-driver, can be introduced for the purpose of turning it. I may, however, dispense with the plug 12 and in place thereof form the socket with a seat 15 for the spring, as in Figs. 2 and 4.

By providing the socket with a seat 8 for an elastic packing-ring and clamping down the packing-ring E in said seat by screwing the threaded end of the valve-casing in the threaded socket leakage will be effectively prevented, it being observed that without such seat and packing-ring air would find its way between the engaging threaded portions of the socket and valve-casing.

What I claim as my invention is—

The combination with a pneumatic tire of a rubber base attached to a suitable portion of the tire; a socket D embedded within the rubber base and formed with an annular flange 9, a threaded opening 7 and an annular seat 8; a packing-ring E fitted to the annular seat 8 in the socket; and a valve-casing having a reduced externally-threaded end adapted to engage the screw-threaded opening of the socket and having also a shoulder 5 adapted to be clamped down upon the packing-ring, substantially as described.

PERCY L. CLARK.

Witnesses:
A. F. DURAND,
MARGARET M. WAGNER.